United States Patent

[11] 3,588,172

[72] Inventor Eugene R. McGregor
Huntington Beach, Calif.
[21] Appl. No. 806,394
[22] Filed Mar. 12, 1969
[45] Patented June 28, 1971
[73] Assignee Universal Oil Products Company
Des Plaines, Ill.

[54] RECLINING SEAT
4 Claims, 3 Drawing Figs.
[52] U.S. Cl. .................................................. 297/355,
297/284, 297/191
[51] Int. Cl. ...................................................... A47c 1/024
[50] Field of Search............................................ 297/355,
284, 377, 361, 191

[56] References Cited
UNITED STATES PATENTS
2,450,654  10/1948  Gleitsman et al. ............ 297/355
2,981,314  4/1961   Eklof et al. .................... 297/284
3,037,812  7/1958   Monroe......................... 297/355
3,123,396  3/1964   Searle............................. 297/284X
3,463,544  8/1969   Froelich ......................... 297/284

Primary Examiner—James T. McCall
Attorneys—James R. Hoatson, Jr. and Philip T. Liggett ABSTRACT: A reclining seat having a high back pivot and an upper back portion which is inclined forward when the back is in an upright position and which straightens into linear alignment with a lower back portion when the seat back is reclined.

PATENTED JUN 28 1971

INVENTOR:
Eugene R. McGregor

BY: James R. Hoxton, Jr.
Philip J. Liggett
ATTORNEYS

PATENTED JUN 28 1971

INVENTOR:
Eugene R. McGregor

BY: James R. Hoatson, Jr.
Philip T. Liggett
ATTORNEYS

RECLINING SEAT

This invention relates to a reclining seat having a high back pivot and an upper back portion which is inclined forward when the back is in an upright position. The upper portion of the back straightens into linear alignment with the lower back portion when the seat back is reclined. More particularly, the straightening of the seat back as the seat is tilted back through a certain angle provides a greater degree of reclination for the headrest portion of the seat than does a simple backward pivoting action through the same angle of a seat back at approximately the hips of a seat occupant.

Currently there are several methods of increasing the reclination of a seat over that achieved in a seat having a simple pivoting action of a seat back at approximately the hips of a seat occupant. One seat frequently used to achieve this purpose is a seat in which the seat cushion slides forward drawing with it the lower portion of the seat back, thereby increasing the angle of seat back reclination. This mechanical action has only limited effectiveness when used as the sole reclination adjustment, but has more extensive use when combined with a simple pivoting of the seat back. This combination of actions requires more mechanical links and coacting parts than does a single recline mechanism, however, and so adds to the weight of the seat. The factor of weight is often very important in a seat, particularly in the filed of aircraft seating.

Another feature of many conventional seats which adds significantly to the weight requirement of a seat is the normally low pivot of the back. The pivot of the back refers to the pivot of the back frame or back support with respect to the seat frame as opposed to the axis at which the back cushion pivots about the chassis or seat frame. Where the pivot of a seat back is low, that is, in the hip area of the seat occupant, the structure of the back cushion and the back-supporting members must be reinforced to prevent the seat from breaking when strong torsional forces are exerted at the upper portion of the seat. Such forces occur in airplane travel when a passenger seeks to lift himself up from his seat by pulling backwards on the top of the seat in front of him. By raising the pivot point, the length of the lever arm formed by the seat back is reduced, thereby reducing the severity of torsional moments on the seat and reducing the required structural sturdiness and the accompanying increase in weight.

The provision of a high back pivot in an airline seat reduces the weight requirement of the seat in another respect. A meal tray for each passenger is normally mounted by arms from the seat immediately in front of a passenger. The pivot of the tray arms from the back of each seat must be mounted on the chassis or other immovable part of the seat or else the tray will move with every adjustment of reclination of the seat. If the back pivot is high, the tray arms may be quite short as the pivot of the tray arms may coincide with the back pivot. If the back pivot is low, however, the tray arms must be at least long enough to extend down to the back pivot, thereby increasing the weight of the seat. While this weight is not significant for a single seat, the cumulative effect in transportation seating of any type is substantial.

It is an object of this invention to provide a structurally sound reclining seat having a high back pivot. A high back pivot will give rise to a cost and weight reduction in the seat as heretofore described.

It is a further object to provide a reclining seat having an upper back portion wherein the degree of reclination attained from a backward pivoting of the seat back is accentuated and exceeds the arc through which the seat back is pivoted. The extent of angular rotation experienced by the upper portion of the seat back will in all cases exceed the arc traversed by the lower portion of the seat back as pivoted about the seat chassis.

In a broad aspect this invention is a reclining seat comprising: a chassis having a portion extending rearward and upward at the sides of said seat to approximately the armrest level of a seated occupant; a seat pan fastened to said chassis; a seat cushion mounted on said seat pan; a back cushion swingably connected to said chassis at the rear of said seat cushion; a diaphragm supporting the rear surface of said back cushion and fastened to said chassis along the rear edge of said seat pan at a back suction pivot and having upper and lower portions forming a forward opening obtuse angle when said back cushion is in an upright position; a back support having an upper part connected to said upper portion of said diaphragm and from which a linear extension would pass through said back suction pivot when said back cushion is in a reclined position, and having a lower part pivotally connected to said rearward portion of said chassis at a back support pivot; and a compression lock pivotally attached to said chassis and to said lower part of said back support to the rear of said back support pivot.

The upward and rearward extending portion of the seat frame as viewed from the side may be either forward or rearward of the armrest level of a seated occupant, but in most applications is slightly rearward of the armrests and the back of the occupant. In such a seat, the actual longitudinal distance between the upward extending portion of the chassis and the back of the seat occupant varies with the seat adjustment, and is normally greater when the seat is in the upright position than the seat is reclined.

The back cushion may be connected directly to the seat chassis but more often is connected indirectly to the chassis through the lower portion of the diaphragm or the rear edge of the eat pan.

Any type of conventional compression lock may be used which, when actuated, can be compressed in length and locked in compressed position and which, when released, will expand in length. While the compression lock may be a pneumatic or mechanical compression lock, hydraulic compression locks are more frequently used.

In the preferred embodiment of the seat of this invention, the upper part and the lower part of the back support are rigidly joined at a forward opening obtuse angle. With this configuration of the back support, a maximum reclination can be achieved with a minimum of structural material required for the lower part of the back support and without an unsightly forward or rearward protrusion of the joint between the upper and lower parts of the back support. In the preferred embodiment of this invention, the back support is comprised of an upper part shaped in the form of an inverted U, and a lower part comprised of two downward and forward extending legs of the inverted U bracketing the seat back. In this embodiment, the lower portion of the back cushion passes backward between the legs of the lower part of the back support in adjusting the seat from an upright to a reclined position. Conversely, the back cushion passes forward between the aforesaid legs returning to an upright position from a reclined position.

To improve the appearance of the seat and to provide protection both to the working parts of the seat-adjusting mechanism and to the clothing and limbs of persons near the seat, a rearwardly and upwardly extending shroud is mounted on a side of the chassis, thereby at least partially concealing the back support pivot and the compression lock from view. This shroud ordinarily has a neat appearance and can either be securely fixed to or clipped or snapped onto the seat frame. If shrouds are used on both sides of a seat unit, one shroud will normally conceal both the compression lock and the back support pivot of a seat on one side while the other shroud conceals only the back support pivot of a seat on the other side. If only one shroud is used, such as on the outside of an aisle, the compression lock will be concealed by a shroud only if the compression lock is mounted near the outside or aisle side of the seat.

In the application of the seat of this invention to air or rail travel, it is often advantageous if a tray is pivotally and independently attached to the rearward portion of the supporting frame at the back support pivot. This is a conventional feature currently available in most airplane seats.

This seat is not restricted in application to aircraft seating, however, as it may also be utilized in any other field of human seating. This invention may be more clearly illustrated by reference to the accompanying drawings in which.

Figure 1:
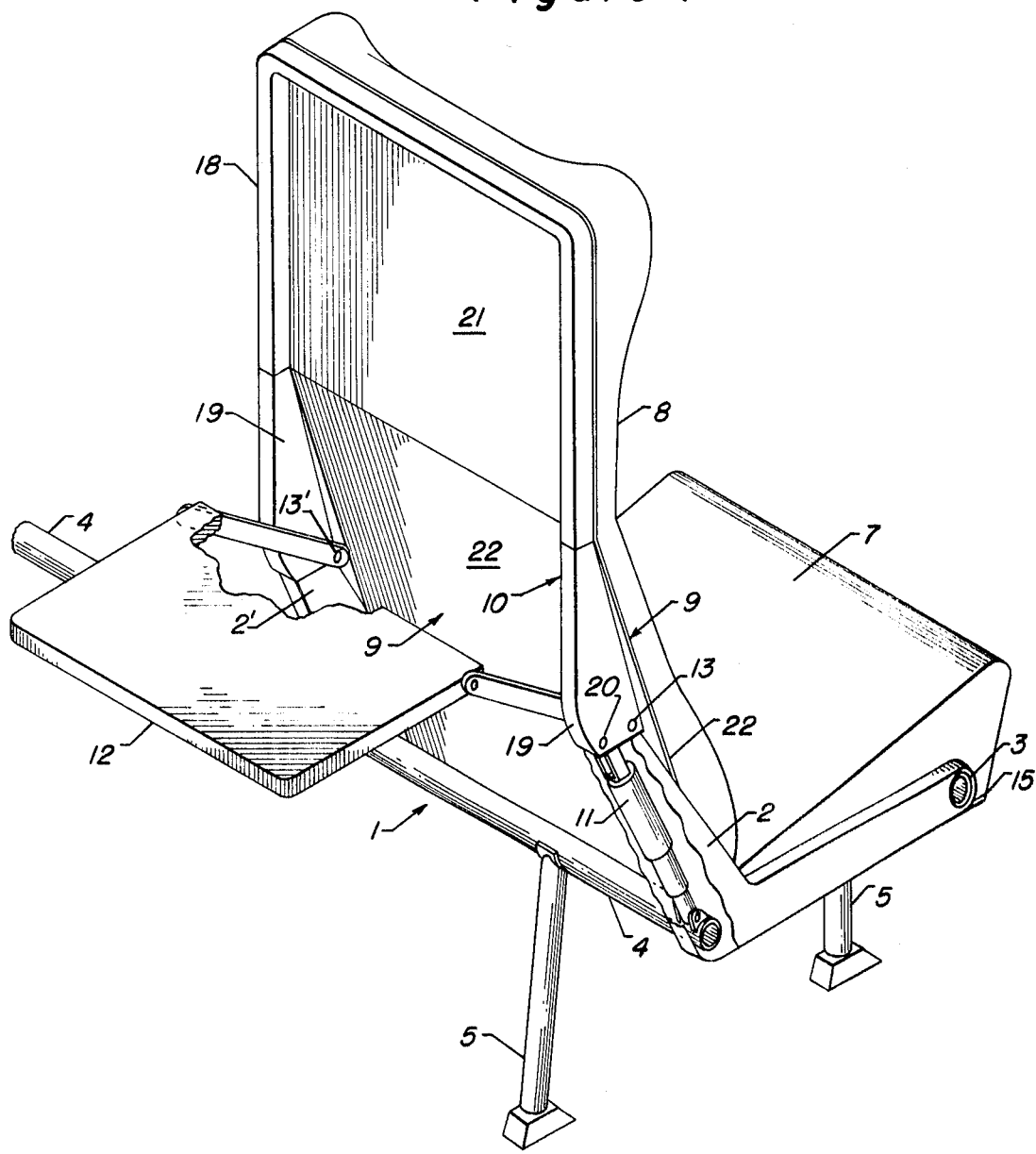
FIG. 1 is a perspective view of the preferred embodiment of the seat of this invention.

Referring now to the drawings, there is shown a reclining seat comprising a chassis or supporting frame 1, which will accommodate two or three passenger seats positioned abreast. This arrangement is standard in most instances of aircraft, railroad, and bus seating. Only the right-hand portion of chassis 1 and the seat accommodated thereby is illustrated in FIG. 1. For each seat there is a portion extending rearward and upward from chassis 1 at the sides of the seat. This portion is divided into two pieces 2 and 2' respectively. Piece 2' normally serves both the seat illustrated and a seat positioned to the left thereof. Pieces 2 and 2' extend up and back to pivots 13 and 13' which are approximately at the armrest level of a seat occupant. In addition to pieces 2 and 2' the chassis is comprised of transverse supports 3, and 4, and legs 5, at both the front and rear of the seat. Legs 5 extend downward from transverse supports 3 and 4 at the rear and front of the seat respectively. Legs 5 terminate in feet, the bottoms of which are designed for ready insertion into an airplane seat track. Upward and rearward extending pieces 2 and 2' are fitted over the ends of transverse bars 3 and 4, thereby forming a rigid framework. Pieces 2 and 2' are held laterally in place by any conventional fastening means, such as by retaining pins, force fitting, etc. Pieces 2 and 2' may be assumed to be welded to transverse bars 3 and 4 for the purposes of the illustrations. The chassis 1 is thus held laterally in place by upward and rearward pieces 2 and 2' and is longitudinally restrained by transverse bars 3 and 4. A cushion 7 is mounted upon a metal pan 15 which in turn is riveted to pieces 2 and 2' and transverse bars 3, and 4. Cushion 7 is a foam plastic unit encased in a readily removable dress cover. Cushion 7 must be readily removable from seat pan 15 in the event of a required use for emergency flotation. Seat cushion 7, therefore, is attached to seat pan 15 using any conventional fastening means which facilitates quick removal. Snaps and tape are commonly used for this purpose. Seat 7 is thereby held rigidly but removably in place against seat pan 15 and chassis 1.

Diaphragm 9 has an upper portion 21 and a lower portion 22. Diaphragm portions 21 and 22 form a forward opening obtuse angle when the back cushion is in an upright position, as in FIG. 2. Upper portion 21 is a solid sheet metal pan fastened at its rear surface to an upper part 18 of a back support 10 and bonded at its forward surface to the upper portion of back cushion 8. Lower portion 22 is a taut nylon cloth structure fastened to upper portion 21 at one end and fastened to chassis 1 at the other end. Lower portion 22 may be either fastened directly to chassis 1 or indirectly to chassis 1 by a connection to the rear edge of metal seat pan 15. Whatever the manner of attachment, the attached lower edge of lower portion 22 forms a junction between diaphragm 9 and chassis 1. This junction is the back cushion pivot 14 of the seat. Back cushion 8 is securely fastened to diaphragm 9 throughout the mutual surface of contact by conventional fastening means, such as snaps or tape. The lower edge of back cushion 8 may be connected directly to chassis 1. More often, however, it is connected indirectly to chassis 1 by attachment to lower portion 22 of diaphragm 9 or to the rear edge of metal seat pan 15.

Figure 3:
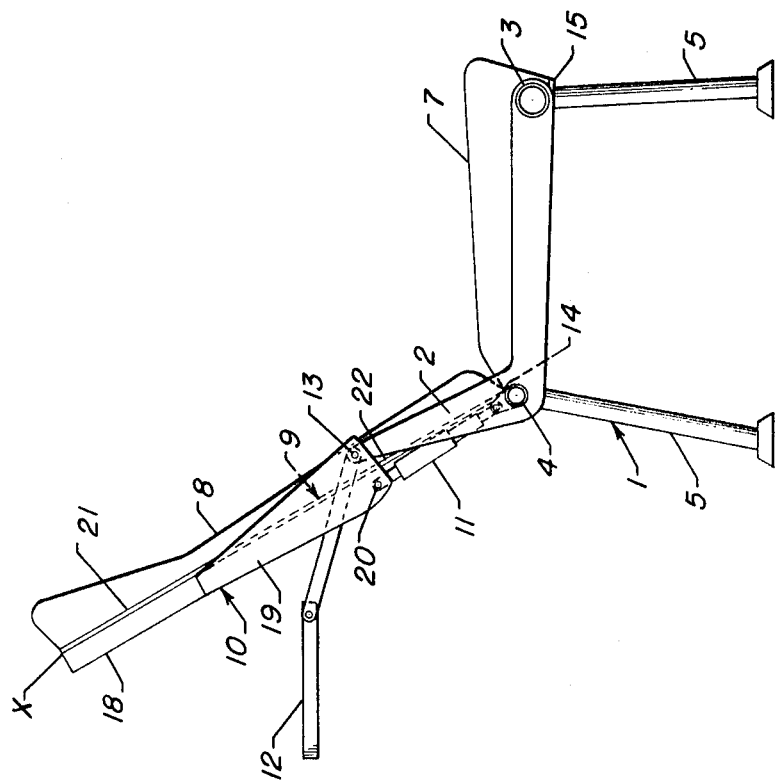
FIG. 3 is an elevational view of the seat of FIG. 1 in a reclined position.

A back support 10 is comprised of an upper part 18 and a lower part comprised of legs 19. Upper part 18 and the lower part are rigidly joined at a forward opening obtuse angle. Upper part 18 is connected to the upper portion 21 of the diaphragm 9. A linear extension from X, the extreme top of the seat, downward along the interface between portion 21 of diaphragm 9 and part 18 of back support 10 through the back cushion pivot 14 when the back cushion 8 is in a reclined position, as illustrated in FIG. 3. Legs 19 of the lower part of back support 10 are pivotally connected to pieces 2 and 2' of the upward and rearward extending portion of chassis 1 at back support pivots 13 and 13' respectively. Also pivoted at back pivots 13 and 13' is a tray 12 for serving an occupant seated behind the seat depicted. Pivots 13 and 13' each comprise an axle which extends through a leg 19 of the lower part of back support 10, through pieces 2 or 2' of the upward extending portion of chassis 1, and through the arms of tray 12. The three structural pieces involved may all be pivoted about pivots 13 or 13' or pivots 13 and 13' may each be integrally joined to any one, but only one, of these structural pieces. On one side of the seat, a compression lock 11 is pivotally attached to chassis 1 by brackets extending from transverse bar 4. A pin fastens the lower end of compression lock 11 to these brackets. The other end of compression lock 11 is pivotally attached to the lower part of back support 10 at a pivot 20. Pivot 20 is to the rear of back support pivot 13 and is comprised of a pin or axle assembly similar to that of pivots 13 and 13'.

Figure 2:
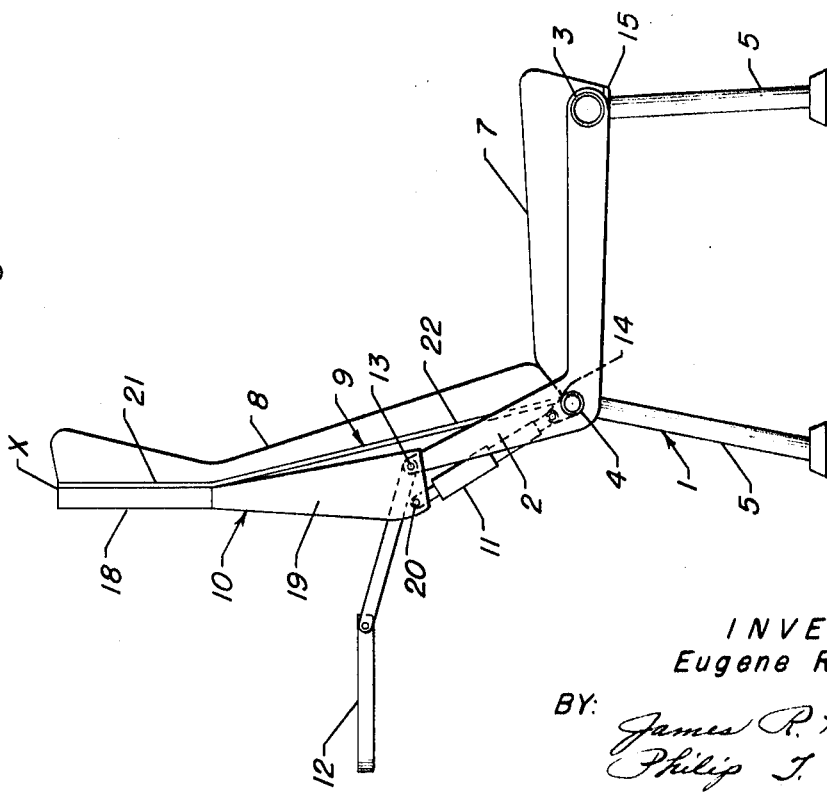
FIG. 2 is an elevational side view of the seat of FIG. 1 in an upright position.

In the operation of the reclining seat illustrated, a beginning position can be considered to be the upright position of FIG. 2. In this position a person occupying the seat and seeking to recline it would activate the compression lock by pressing an actuating button (not shown), and would push back upon the middle and upper portion of back cushion 8. This would tend to rotate back cushion 8 about back cushion pivot 14. It would also pivot back support 10 about axles 13 and 13', thereby pulling the lower portion 22 of diaphragm 9 to a new attitude. As the back of the seat rotates counterclockwise, the lower portion 22 of diaphragm 9 and the lower portion of back cushion 8 pass backward through the arms 19 of the lower part of back support 10, thereby assuming a configuration as illustrated in FIG. 3. In this configuration, due to the rotation of back support 10, the upper portion 21 and the lower portion 22 of diaphragm 9 are brought into linear alignment with each other, and into radial alignment with respect to back cushion pivot 14 as illustrated in FIG. 3. A linear extension from X at the upper part 18 of back support 10 would pass along the surface of lower portion 22 of diaphragm 9, thereby passing through back cushion pivot 14. Back cushion pivot 14 does not move at any time throughout the reclining sequence. It can be seen that while back support 10 was rotated through an angle of about 35° counterclockwise between FIG. 2 and FIG. 3, the effective angular rotation or reclination of the headrest, that portion of cushion 8 adjacent to upper portion 21 of diaphragm 9, was about 41°. This was because of the straightening effect which back support 10 imparted to diaphragm 9.

It can also be seen that throughout the reclination and the return to the upright position, tray 12 did not move. This is because tray 12 is mounted upon the seat at pivots 13 and 13' which, since they pass through the upward and rearward pieces 2 and 2' of chassis 1, are immovable. As the seat back rises from a recline to an upright position, the headrest again undergoes a greater angular rotation in a clockwise direction than does the lower portion of back cushion 8. This is because of the bending effect which back support 10 imparts to the diaphragm 9.

Whereas a shroud or guard could be mounted upon the upward and rearward extending pieces 2 and 2' of chassis 1 in order to improve the appearance of the mechanisms described herein, this shroud has been omitted in order to clarify the illustration. The compression lock 11 which is illustrated as being of the hydraulic type is commonly used in airline and railway seats. Compression lock 11 is actuated, and as the back suction 8 reclines, the hydraulic fluid is forced from one end of compression lock 11 to another through an internal aperture, thereby slowly allowing compression lock 11 to decrease in length. The opposite effect is noted when compression lock 11 is released. In this case, the back cushion returns from the position of FIG. 3 to that of FIG. 2. The actuation and release mechanisms are well known in the art and have not been illustrated in the drawings.

The foregoing description and illustration of the preferred embodiment of this invention have been given for clearness of understanding only, and no unnecessary limitation should be construed therefrom as modifications will be obvious to those skilled in the art.

I claim:

1. A reclining seat comprising:
a. a chassis having an upper section extending rearward and upward at each side of said seat to at least the arm rest level of a seated occupant;
b. a seat pan fastened to said seat chassis;
c. a seat cushion mounted on said seat pan;
d. a back cushion swingably connected to said chassis at the rear of said seat cushion;
e. a diaphragm supporting the rear surface of said back cushion and fastened to said chassis along the rear edge of said seat pan at a back cushion pivot and having upper and lower portions forming a forward opening obtuse angle when said back cushion is in an upright position;
f. a back support having an upper part connected to said upper portion of said diaphragm and from which a linear extension would pass through said back cushion pivot when said back cushion pivot when said back cushion is in a reclined position, and having a lower part pivotally connected to the upper end portions of said upward extending section of said chassis at a back support pivot at a level substantially above said back cushion pivot whereby said lower portion of said diaphragm passes between said upper section of said chassis as said back cushion changes between a reclined position and an upright position; and
g. A compression lock pivotally attached to said chassis and to said lower part of said back support to the rear of said back support pivot.

2. A reclining seat comprising:
a. a chassis having a portion extending rearward and upward at the sides of said seat to at least the arm rest level of a seated occupant;
b. a seat pan fastened to said chassis;
c. a seat cushion mounted on said seat pan;
d. a back cushion swingably connected to said chassis at the rear of said seat cushion;
e. a diaphragm supporting the rear surface of said back cushion and fastened to said chassis along the rear edge of said seat pan at a back cushion pivot and having upper and lower portions forming a forward opening obtuse angle when said back cushion is in an upright position;
f. a back support having an upper part and a lower part and said upper part and said lower part of said back support are rigidly joined together at a forward opening obtuse angle and said upper part is connected to said upper portion of said diaphragm and a linear extension from said upper part would pass through said back cushion pivot when said back cushion is in a reclined position, and said lower part is pivotally connected to said rearward portion of said chassis at a back support pivot; and
g. a compression lock pivotally attached to said chassis and to said lower part of said back support to the rear of said back support pivot.

3. A reclining seat comprising:
a. a chassis having a portion extending rearward and upward at the sides of said seat to at least the arm rest level of a seated occupant;
b. a seat pan fastened to said chassis;
c. a seat cushion mounted on said seat pan;
d. a back cushion swingably connected to said chassis at the rear of said seat cushion;
e. a diaphragm supporting the rear surface of said back cushion and fastened to said chassis along the rear edge of said seat pan at a back cushion pivot and having upper and lower portions forming a forward opening obtuse angle when said back cushion is in an upright position;
f. a back support having an upper part connected to said upper portion of said diaphragm and from which a linear extension would pass through said back cushion pivot when said back cushion is in a reclined position, and having a lower part pivotally connected to said rearward portion of said chassis at a back support pivot;
g. a tray pivotally and independently attached to said rearward portion of said chassis at said back support pivot; and
h. a compression lock pivotally attached to said chassis and to said lower part of said back support to the rear of said back support pivot.

4. A reclining seat comprising:
a. a chassis having a portion extending rearward and upward at the sides of said seat to at least the arm rest level of a seated occupant;
b. a seat pan fastened to said chassis;
c. a seat cushion mounted on said seat pan;
d. a back cushion swingably connected to said chassis at the rear of said seat cushion;
e. a diaphragm supporting the rear surface of said back cushion and fastened to said chassis along the rear edge of said seat pan at a back cushion pivot and having upper and lower portions forming a forward opening obtuse angle when said back cushion is in an upright position;
f. a back support having an upper part connected to said upper portion of said diaphragm and from which a linear extension would pass through said back suction pivot when said back cushion is in a reclined position, and having a lower part pivotally connected to said rearward portion of said chassis at a back support pivot;
g. a compression lock pivotally attached to said chassis and to said lower part of said back support to the rear of said back support pivot; and
h. a rearwardly and upwardly extending shroud mounted on a side of said chassis, thereby at least partially concealing said back support pivot and said compression lock from view.